Figure 1:
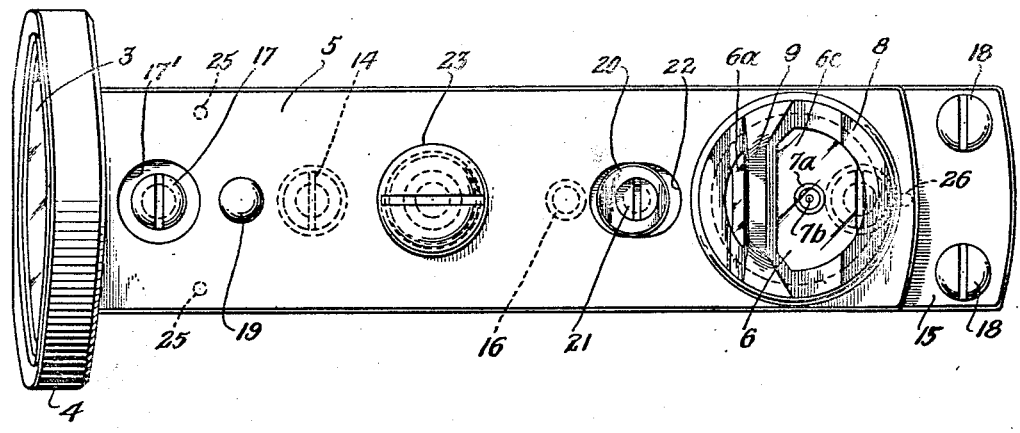

March 31, 1953  C. S. DAVIS  2,633,051
GUN SIGHT
Filed Sept. 28, 1945

INVENTOR
Clinton S. Davis
BY
Symmes, Twiss & Lechner
ATTORNEYS

Patented Mar. 31, 1953

2,633,051

UNITED STATES PATENT OFFICE 2,633,051

GUN SIGHT

Clinton S. Davis, Chicago, Ill., assignor to Swain Nelson Company, a corporation of Illinois Application September 28, 1945, Serial No. 619,160

7 Claims. (Cl. 88—2.3)

This invention relates to sighting mechanism, and is particularly concerned with a gun sight. Although the principles of the invention are applicable to sights for a wide variety of purposes, including guns of a wide variety of types, the embodiment herein described and illustrated is especially suited as a sight for a shotgun or rifle.

The invention is concerned with that general type of optical sight incorporating a curved or dished reflector positioned in the line of sighting, with the concave surface thereof presented toward the eye and further incorporating a means for projecting a reticle image onto the concave surface to be reflected therefrom along the line of sighting, so as to secure the optical illusion of projection of the reticle in space onto the target. The invention is applicable to such sights whether or not the reflector is transparent. In the case of a transparent reflector a selective reflective coating is preferably applied to the reflector and both the target and the reticle image can be viewed within the area of the reflector. In the case of an opaque reflector, the target is viewed with one eye along a line of sighting offset to one side of the reflector and the reticle image is viewed in the area of the reflector. In either case the optical illusion of projection of the reticle in space is achieved.

The principal object of the present invention is the provision of a novel device for projection of the reticle onto the concave surface of the reflector. According to the invention this is achieved by a device which is of "self-energizing" character, in the sense that it does not incorporate an artificial source of light but utilizes surrounding light, either natural or artificial.

Another object of the invention is the employment of a prism device for projection of a reticle image onto the reflector, the employment of a prism being of advantage since it provides for "folding" the optical path, thereby contributing to compactness of the sight.

Still further, in the preferred embodiment of the invention the prism device has the reticle directly associated with a surface thereof and has substantial surface area thereof exposed to the surrounding light in a manner providing for the reception of sufficient of the surrounding light, either natural or artificial, to effect projection of the reticle image as a result of reflection of light from the reticle.

Still another object of the invention is arrangement of the reflector with its focal axis inclined to the line of sighting, and with the prism device arranged and positioned to project the reticle image along an axis also inclined to the focal axis of the reflector, at an angle providing for reflection of the image in a direction along the line of sighting. In this way the prism device is offset appreciably to one side of the line of sighting and therefore does not impair the desired vision to the reflector.

A further object of the invention is the provision of a mounting mechanism for the reflector and the prism device enabling convenient removal and replacement of the optical parts of the sight, so that the optical parts need not always remain attached to the gun and can be carried separately, for better protection. The mounting mechanism is further arranged to provide for convenient adjustment of the optical parts of the sight with respect to the gun, this arrangement being such as to establish a given adjustment and insure that the optical parts will always be returned to the same position on the gun when the optical parts are removed and replaced.

How the foregoing and other objects and advantages are attained will appear more fully from the following description referring to the accompanying drawing in which—

Figure 2:
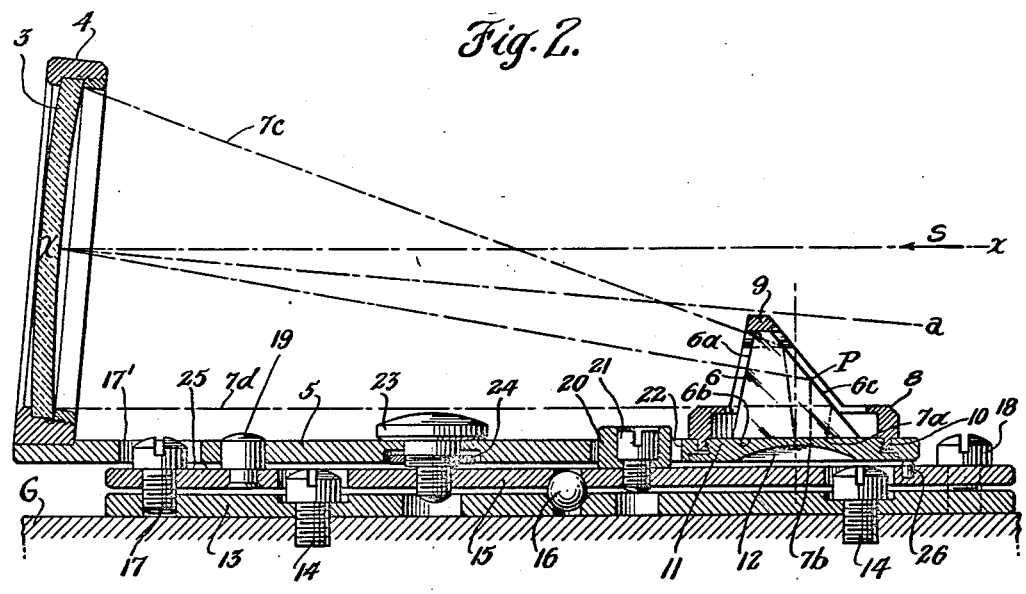

Figure 1 is a plan view of a sight constructed according to the present invention; and Figure 2 is a vertical sectional view through the sight shown in Figure 1.

As seen in the drawing, a dished, preferably spherically curved, reflector member 3 is mounted by means of a ring 4 on a mounting plate 5. The plate 5 is adapted to be adjustably and removably mounted on a gun or gun barrel by adjustable mechanism described hereinafter, a fragment of the gun barrel being indicated at G in Figure 2.

For the purpose of this disclosure it is assumed that the reflector 3 is of the transparent type, having a selective reflective coating thereon. From Figure 2 it will be seen that the reflector 3 is tilted rearwardly at its upper edge so that its focal axis $x$—$a$ is inclined downwardly and rearwardly with reference to the line of sighting which is indicated at $x$—$x$. The direction of sighting is indicated by the arrow S and it will be understood that the target or object to be sighted is viewed through the reflector 3. This reflector may advantageously be made of optical glass, the surface of which has some limited selective reflective action which in sights for some purposes, may provide sufficient reflection of the reticle image. However, for most purposes, it is preferred to provide the reflector with a selective reflective coating on its concave surface of known type applied according to known methods. The specific material employed for this coating, and the specific method employed to apply it, form no part of the present invention per se, although it is mentioned, by way of example, that the coating may suitably be made of several alternate films of magnesium fluoride and zinc sulfide which are evaporated under high vacuum onto the surface. For such coating purposes the thickness of the individual films should approximate ¼ of the wave length of light, and the total thickness of the superimposed films should be at least ½ the wave length of light. The effect of such a selective reflective coating (built up, for instance of three films) is to selectively reflect light rays in a portion only of the color spectrum. Advantageously, for the purposes of the present invention, the coating (for instance magnesium fluoride) is of a character acting to reflect yellow and orange rays, while transmitting rays toward the blue end of the spectrum. In this way the reticle image reflected from the coating to the eye is of yellow or yellowish orange color which stands out in effective contrast with most targets or target areas to be viewed, including clouds and blue sky. The color contrast between the reticle image and the target and target area is also emphasized since the selective reflective coating blocks at least a portion of the yellow and orange rays coming from the target area toward the eye along the line of sighting.

The device for projecting the reticle image onto the concave surface of the reflector 3 comprises a prism 6 mounted on the plate 5 in the manner described herebelow. First note, however, that the prism is 3-sided, one side 6a being presented toward the reflector 3, another side 6b being presented downwardly, and the third side 6c being presented rearwardly and upwardly. The reticle advantageously comprises a ring 7a encircling a dot or bull's-eye 7b. Although the reticle may be applied in a variety of ways, it is preferred to form the reticle by etching the surface 6b in the desired reticle pattern and applying a light colored (preferably white) coating to the etched pattern. The remainder of the surface 6b should be covered with a dark colored (preferably black) coating, for the purpose of achieving maximum contrast. It is of advantage to employ a light colored or white reticle marking, so as to provide maximum light reflection therefrom and thus provide an image as brilliant as possible.

The prism is so cut or formed that the front surface 6a thereof is inclined upwardly and rearwardly somewhat, i. e., in the same sense as the inclination of the reflector 3. Specifically the inclination of the surface 6a from the vertical should preferably be twice that of the reflector 3. The hypotenuse or surface 6c of the prism is so angled as to reflect light from the reticle onto the surface of the reflector 3. This requires an inclination with respect to the vertical which is equal to 45° minus the angle of reflector 3 with respect to the vertical.

The angling of the prism surfaces provides for reflection of light from the bull's-eye 7b of the reticle upwardly to point P on the surface 6c, whereupon this light is reflected in the direction represented by the line P—$x$ to the center of the reflector 3. From Figure 2 it will be seen that line P—$x$ is inclined with reference to the focal axis $x$—$a$ at an angle equal to the angle between the focal axis $x$—$a$ and the line of sighting $x$—$x$. When sighting along the line $x$—$x$, therefore, the bull's-eye is reflected by the reflector 3 directly along the line $x$—$x$ to the eye. It will be understood, however, that accurate sighting exactly along the line $x$—$x$ is not essential in use of the sight, especially when the target being sighted is at a distance approximating the normal focusing distance of the particular sight, for instance 25 yards. Under these conditions, and with the reticle located (optically) at the focal point of the reflector, lateral shift of the eye position will not alter the position in space of the reticle image. At distances other than the normal focusing distance of the sight, most accurate sighting is secured if the line of sighting passes through the reflector at least close to the center thereof.

With an appropriately curved reflector 3, for instance a reflector having a focal length of about 3″ and with a reticle circle 7a of about ⅛″ diameter, the overall diameter of the reticle image as seen in the reflector at an assumed normal viewing distance of about 10″, would be about three-eighths of an inch. Preferably the reflector is at least four or five times the diameter of the reticle image as seen by the eye on the reflector surface, so as to provide considerable lateral and vertical leeway for the eye position with reference to the reflector during sighting. Lines 7c and 7d represent construction lines which may be used to determine that none of the optical path is vignetted.

Because of the optical illusion of projection of the reticle in space to the target, the sight may also be used to assist in gauging the distance to the target. Thus when sighting an object of which the approximate dimensions are known, the reticle image will appear twice as large in relation to the known object at a given distance than at one-half said given distance.

For the purpose of avoiding undesired reflection of light from the front face 6a of the prism to the reflector 3, which might occasionally occur at certain special angles of the sight with reference to a light source, the said front face 6a of the prism is preferably coated with a material having low reflective characteristics. As with the coating applied to the reflector 3, the specific nature of the coating material to be applied to the prism, and the method by which the coating is applied, form no part of the present invention per se, such materials and methods being known in the art. It may be mentioned, however, that a suitable material for the purpose is magnesium fluoride, deposited by volatilization of the fluoride under high vacuum to form a thin film, the thickness dimension of which is of the order of ¼ of the wave length of light.

The front or convex surface of the reflector 3 is also advantageously provided with a coating of low reflective characteristics.

The prism 6 is mounted in a ring 8 having an upwardly arched portion 9 extending up one side, over the top and down the other side of the prism, so as to leave the major portion of both front and rear faces 6a and 6c of the prism exposed to receive light. The ring 8 is provided with an internally threaded lip 10 fitting an aperture formed in the supporting plate 5, the prism and its mounting being retained in position by means of an externally threaded and flanged disk 11 applied from the lower side of the supporting plate 5. A keyway in the disk 11 for a fastening tool is indicated at 12.

The mounting plate 5 provides a rigid support for the reflector 3 and the prism, so that these elements of the sight are rigidly positioned in their proper interrelation. Preferably the optical path from the reflector through the prism to the reticle conforms with the focal length of the reflector, since in this way, the reticle image is sharply defined to the eye when the eye is focused on the distant target. Moreover, parallax, i. e., apparent shift between the reticle pattern and the target when the eye position is shifted, is completely eliminated.

Mechanism is provided for adjustably mounting the plate 5 so that the sight may be accurately adjusted to an individual gun. For this purpose a base plate 13 is employed, being appropriately apertured to pass bolts 14 by which the plate 13 is rigidly and permanently secured to the gun G. Another plate 15 is interposed between plate 13 and the mounting plate 5 for the sight, the plates 13 and 15 having centrally located seats adapted to cooperate with a ball 16 providing freedom for tilting of the plate 15 with reference to the plate 13 in any direction. The angle of tilt is controllable by adjustment of screws 17 and 18—18, the screws being threaded into the plate 13 but extended through somewhat larger apertures in plate 15. Angling of the plate 15 about an axis passing transversely through the ball 16 is effected by loosening bolt 17 and tightening the bolts 18, or vice versa. Angling of the plate 15 about an axis passing fore-and-aft through the ball 16 is effected by loosening one of the bolts 18 and tightening the other. It may be mentioned that the head of bolt 17 projects into an aperture 17' of appreciably larger diameter than the bolt head in order to leave clearance for angular adjustment of the sight about an upright axis in the manner described just below. For this purpose an upright pivot member 19 is rigidly secured in the plate 15 and projects upwardly to cooperate with a closely fitting aperture in the plate 5. This pivot provides a vertical axis about which the plate 5 and the reflector and prism carried thereon may be swung so as to adjust the angle of the sight laterally. The plate 5 is adapted to be adjusted in this sense by means of the eccentric collar 20 which surrounds a bolt 21, the bolt 21 being threaded into plate 15 and the collar 20 being received in a slot 22 provided in plate 5. Upon loosening the bolt 21 the collar 20 may be turned about the axis of the bolt and thereby effect controlled swinging movement of the plate 5 about the vertical pivot axis provided at 19.

With the adjustments as above described, whenever the plate 5 is placed in position on the pivot member 19 and the eccentric collar 20, the predetermined setting of the sight is established. A quick removable knurled thumb nut 23 is employed for retaining the plate 5 and thus the sight in its proper mounted position. This nut 23 is threaded into the plate 15 and is preferably provided with a collar 24 secured thereto so as to prevent loss of the nut when the sight itself is removed from the lower parts of the mounting. In order to insure accurate positioning of plate 5 with reference to plate 15, three small projections are provided on the upper surface of plate 15, as indicated at 25—25 and 26. Whenever removable thumb nut 23 is tightened, these three projections 25—25 and 26 will insure that the plate 5 is properly seated.

In view of the above mounting, the sight itself becomes a readily removable unit, which unit, however, may always be quickly applied to the gun in properly adjusted position, since the removable mounting means is independent of the adjustable mechanism.

From the above it will be seen that a highly accurate optical type sight is provided, the sight being compact and of simple construction, not even requiring a built-in source of artificial light.

I claim:

1. In an optical sighting device comprising a transparent reflector having a generally spherically curved surface carrying a selective reflective coating adapted to be viewed from its concave side and having the axis of said surface inclined from the line of sighting, means cooperating with said reflector for directing light rays to the concavely curved surface of the selective reflective coating in the pattern of a reticle image to be reflected by said coating along the line of sighting, said means comprising a reflective reticle positioned intermediate the reflector and the eye position and offset from the line of sighting in the direction of the inclination of the axis of the reflector, and further comprising a prism having a face presented downwardly and with which face the reticle is associated, the prism having a second face presented toward the reflector and a third face lying in a plane angled obliquely upwardly and forwardly from the plane of the first face to intercept light reflected from the reticle and reflect said light through the second face of the prism to the reflector, said obliquely angled face of the prism being transparent and exposed so that the reticle may receive illumination by light rays originating over a wide range extending from substantially horizontally to substantially vertically.

2. In an optical sighting device comprising a transparent reflector having a generally spherically curved surface carrying a selective reflective coating adapted to be viewed from its concave side and having the axis of said surface inclined from the line of sighting, means cooperating with said reflector for directing light rays to the concavely curved surface of the selective reflective coating in the pattern of a reticle image to be reflected by said coating along the line of sighting, said means comprising a reflective reticle positioned intermediate the reflector and the eye position and offset from the line of sighting in the direction of the inclination of the axis of the reflector, and further comprising a prism associated with the reticle, the prism having surfaces thereof exposed so that the reticle may receive illumination by light rays originating over a wide range extending from substantially horizontally to substantially vertically.

3. In an optical sighting device comprising a concavely curved reflector adapted to be presented toward the eye of the user with the axis thereof inclined from the line of sighting, the reflector being transparent but selectively reflective, a prism positioned intermediate the reflector and the eye position and offset from the line of sighting in the direction of the inclination of the axis of the reflector, one face of the prism being presented downwardly and having a reflective reticle associated therewith, a second face of said prism being presented toward the reflector, and a third face lying in a plane angled obliquely upwardly and forwardly from the plane of the first face to intercept light reflected from the reticle and reflect said light through the second face of the prism to the concavely curved reflector, surfaces of the prism including said third face being transparent and exposed so that the reticle may receive illumination by light rays originating over a wide range extending from substantially horizontally to substantially vertically.

4. In an optical sighting device comprising a transparent reflector having a generally spherically curved surface carrying a selective reflective coating adapted to be viewed from its concave side and having the axis of said surface inclined from the line of sighting, means cooperating with said reflector for directing light rays to the concavely curved surface of the selective reflective coating in the pattern of a reticle image to be reflected by said coating along the line of sighting, said means comprising a reflective reticle positioned intermediate the reflector and the eye position and offset from the line of sighting in the direction of the inclination of the axis of the reflector, the said reflective reticle being exposed so that it may receive illumination, by light rays originating over a wide range extending from substantially horizontally to substantially vertically.

5. A construction in accordance with claim 4 and further including a prism, the reflective reticle being disposed substantially horizontally and being exposed through said prism to receive illumination throughout the range specified in claim 4.

6. In an optical sighting device comprising a transparent reflector having a generally spherically curved surface carrying a selective reflective coating adapted to be viewed from its concave side and having the axis of said surface inclined from the line of sighting, means cooperating with said reflector for directing light rays to the concavely curved surface of the selective reflective coating in the pattern of a reticle image to be reflected by said coating along the line of sighting, said means comprising a reflective reticle positioned intermediate the reflector and the eye position and offset from the line of sighting in the direction of the inclination of the axis of the reflector, and said reticle lying in a plane so angled with respect to the vertical and being exposed through such a broad angle above the horizontal as to receive light throughout a wide range of angles of acceptance extending substantially from the vertical to the horizontal.

7. In an optical sighting device comprising a transparent reflector having a generally spherically curved surface carrying a selective reflective coating adapted to be viewed from its concave side and having the axis of said surface inclined from the line of sighting, mechanism for reflecting a reticle image into the line of sighting comprising a prism positioned intermediate the reflector and the eye position and offset from the line of sighting in the direction of the inclination of the axis of the reflector, said prism having a bottom substantially horizontal surface, and a reflective reticle at said bottom surface, the prism further having a second surface in a plane angled obliquely upwardly and forwardly from the plane of the bottom surface to intercept light reflected from the reticle through the prism and reflect said light upwardly and forwardly through the prism to the reflector, the upper portions of the prism including said second surface being transparent and being in major part exposed for reception of light through a wide angle extending from substantially vertically and thereby to provide for illumination of the reticle by light received by the prism through said wide angle, whereby the reticle is brilliantly illuminated by natural light.

CLINTON S. DAVIS.

REFERENCES CITED

The following references are of record in the file of this patent:

UNITED STATES PATENTS

| Number | Name | Date |
|---|---|---|
| 683,203 | Grubb | Sept. 24, 1901 |
| 1,678,493 | Albada | July 24, 1928 |
| 1,985,067 | Wandersleb | Dec. 18, 1934 |
| 2,159,199 | Bennett | May 23, 1939 |
| 2,178,245 | Schwarz | Oct. 31, 1939 |
| 2,187,057 | Sauer | Jan. 16, 1940 |

FOREIGN PATENTS

| Number | Country | Date |
|---|---|---|
| 22,127 | Great Britain | of 1900 |
| 6,538 | Great Britain | of 1903 |
| 269,447 | Germany | Jan. 22, 1914 |
| 452,644 | Germany | Nov. 15, 1927 |